United States Patent
Nigro et al.

(10) Patent No.: US 9,511,324 B2
(45) Date of Patent: Dec. 6, 2016

(54) METHOD FOR OPERATING A REDUCTANT METERING PROCESS OF AN SCR CATALYTIC CONVERTER SYSTEM, AND CORRESPONDING SCR CATALYTIC CONVERTER SYSTEM

(71) Applicant: VOLKSWAGEN AKTIENGESELLSCHAFT, Wolfsburg (DE)

(72) Inventors: Giampaolo Nigro, Wolfsburg (DE); Martina Kösters, Hannover (DE); Thorsten Düsterdiek, Hannover (DE)

(73) Assignee: VOLKSWAGEN AKTIENGESELLSCHAFT, Wolfsburg (DE)

(*) Notice: Subject to any disclaimer, the term of this patent is extended or adjusted under 35 U.S.C. 154(b) by 0 days.

(21) Appl. No.: 14/405,089

(22) PCT Filed: May 6, 2013

(86) PCT No.: PCT/EP2013/059396
§ 371 (c)(1),
(2) Date: Dec. 2, 2014

(87) PCT Pub. No.: WO2013/178435
PCT Pub. Date: Dec. 5, 2013

(65) Prior Publication Data
US 2015/0147250 A1 May 28, 2015

(30) Foreign Application Priority Data
Jun. 2, 2012 (DE) .................. 10 2012 010 991

(51) Int. Cl.
*B01D 53/86* (2006.01)
*F01N 3/20* (2006.01)
(Continued)

(52) U.S. Cl.
CPC ....... *B01D 53/8696* (2013.01); *B01D 53/8631* (2013.01); *F01N 3/208* (2013.01);
(Continued)

(58) Field of Classification Search
None
See application file for complete search history.

(56) References Cited

U.S. PATENT DOCUMENTS 8,701,338 B1 * 4/2014 Walsh, Jr. ............. A01M 23/12
43/139
2009/0272104 A1 * 11/2009 Garimella .......... B01D 53/9409
60/287
(Continued)

FOREIGN PATENT DOCUMENTS

DE 102 26 636 A1 2/2003
DE 102 47 989 A1 4/2004
(Continued)

OTHER PUBLICATIONS

International Search Report for PCT International Application No. PCT/EP2013/059396, mailed Sep. 5, 2013.
(Continued)

*Primary Examiner* — Melvin C Mayes
*Assistant Examiner* — Sheng H Davis
(74) *Attorney, Agent, or Firm* — Pearl Cohen Zedek Latzer Baratz LLP

(57) ABSTRACT

The invention relates to an SCR catalytic convertor system and a method for operating a reductant metering process of an SCR catalytic converter system (14) of an internal combustion engine (10), wherein the SCR catalytic converter system (14) has a first SCR exhaust emission control device (16), an SCR catalytic converter (18) arranged downstream of the SCR exhaust emission control device, and a
(Continued)

reductant metering device (20) for metering a reductant into the exhaust gas flow upstream of the first SCR exhaust emission control device (16), wherein the reductant metering process is controlled at least depending on a temperature of the first SCR exhaust emission control device (16) and of the SCR catalytic converter (18) arranged downstream, wherein (I) if the temperature of the first SCR exhaust emission control device (16) is greater than or equal to a predetermined minimum temperature (T_SPF min) and the SCR catalytic converter (18) arranged downstream is less than a predetermined minimum temperature (T_SCR min), the reductant metering process occurs in a first operating mode in such a way that a reductant filling level (NH3_SPF) of the first SCR exhaust emission control device (16) is less than the maximum reductant filling level (NH3_SPF_max) of the first SCR exhaust emission control device, and (II) if the temperature of the SCR catalytic converter (18) arranged downstream is greater than or equal to the minimum temperature (T_SCR min) of the SCR catalytic converter arranged downstream, the reductant metering process occurs at least at times in a second operating mode in such a way that the reductant filling level (NH3_SPF) of the first SCR exhaust emission control device (16) is greater than the maximum reductant filling level (NH3_SPF_max) of the first SCR exhaust emission control device, such that a reductant penetration passing through the first SCR exhaust emission control device (16) hits the SCR catalytic converter (18) arranged downstream.

12 Claims, 3 Drawing Sheets

(51) Int. Cl.
*F01N 13/00* (2010.01)
*F01N 3/035* (2006.01)

(52) U.S. Cl.
CPC ........ *F01N 3/2066* (2013.01); *F01N 13/0093* (2014.06); *B01D 2251/2062* (2013.01); *F01N 3/035* (2013.01); *F01N 2340/02* (2013.01); *F01N 2560/026* (2013.01); *F01N 2560/06* (2013.01); *F01N 2560/14* (2013.01); *F01N 2610/02* (2013.01); *F01N 2900/0412* (2013.01); *F01N 2900/1404* (2013.01); *F01N 2900/1622* (2013.01); *Y02T 10/24* (2013.01)

(56) References Cited

U.S. PATENT DOCUMENTS

| | | | |
|---|---|---|---|
| 2010/0242454 A1* | 9/2010 | Holderbaum | B01D 53/9409 60/301 |
| 2011/0023463 A1 | 2/2011 | Dobson et al. | |
| 2011/0023591 A1* | 2/2011 | Dobson | F01N 3/106 73/114.75 |
| 2011/0064632 A1* | 3/2011 | Huang | B01D 53/9477 423/212 |

FOREIGN PATENT DOCUMENTS

| | | |
|---|---|---|
| DE | 102 54 764 A1 | 6/2004 |
| DE | 10 2004 031 624 A1 | 2/2006 |
| DE | 10 2005 055 240 A1 | 5/2007 |
| DE | 10 2010 032 544 A1 | 2/2011 |
| EP | 105 20 09 A1 | 11/2000 |
| EP | 2 295 750 A1 | 3/2011 |
| EP | 2 439 384 A1 | 4/2012 |
| FR | 2 902 139 A1 | 12/2007 |

OTHER PUBLICATIONS

German Search Report for German Application No. DE102012010991, dated Sep. 20, 2012.

* cited by examiner

METHOD FOR OPERATING A REDUCTANT METERING PROCESS OF AN SCR CATALYTIC CONVERTER SYSTEM, AND CORRESPONDING SCR CATALYTIC CONVERTER SYSTEM

CROSS-REFERENCE TO RELATED APPLICATIONS

This application is a National Phase Application of PCT International Application No. PCT/EP2013/059396, International Filing Date May 6, 2013, claiming priority of German Patent Application No. 10 2012 010 991.1, filed Jun. 2, 2012, which is hereby incorporated by reference.

FIELD OF THE INVENTION

The invention relates to a method for carrying out a reductant metering process of an SCR catalytic converter system that functions according to the principle of selective catalytic reduction (SCR). The invention also relates to a catalytic converter system that is configured to carry out the method.

BACKGROUND OF THE INVENTION

Internal combustion engines that are at times or predominantly operated with a lean air-fuel mixture produce nitrogen oxides $NO_x$ (mainly $NO_2$ and NO), thus requiring $NO_x$-reducing measures. An engine-related measure aimed at reducing $NO_x$ raw emissions in the exhaust gas is the exhaust-gas return approach, in which part of the exhaust gas of the internal combustion engine is returned to the combustion air, as a result of which the combustion temperature is lowered, thereby reducing $NO_x$ formation. However, the exhaust-gas return approach is not always sufficient to meet statutory $NO_x$ limit values, which is why an active exhaust-gas after-treatment is additionally needed in order to lower the final $NO_x$ emissions. A known $NO_x$ exhaust-gas after-treatment calls for the use of $NO_x$ storage catalysts that, during lean operation (at $\lambda>1$), store nitrogen oxides in the form of nitrates and, at short intervals with a rich exhaust-gas atmosphere ($\lambda<1$), they desorb the stored nitrogen oxides and reduce the reductants that are present in the rich exhaust gas so as to form nitrogen $N_2$.

Another known approach for converting nitrogen oxides that are present in the exhaust gases of internal combustion engines that can run with lean mixtures is the use of catalytic converter systems that function according to the principle of selective catalytic reduction (SCR). These systems comprise at least one SCR catalytic converter that, in the presence of a reductant that has been added to the exhaust gas, usually ammonia $NH_3$, converts the nitrogen oxides that are present in the exhaust gas into nitrogen and water. Here, the ammonia can be metered into the exhaust-gas stream from an aqueous ammonia solution or it can be obtained from a precursor compound, for example, urea in the form of an aqueous solution or solid pellets by means of thermolysis and hydrolysis. A new approach for ammonia storage in vehicles comprises $NH_3$ storage materials that reversibly bind ammonia as a function of the temperature. In particular, metal ammine storage complexes are known in this context such as, for example, $MgCl_2$, $CaCl_2$ and $SrCl_2$, which store ammonia in the form of a complex compound so as to be present, for example, as $MgCl_2(NH_3)_x$, $CaCl_2(NH_3)$ or $SrCl_2(NH_3)$. The ammonia can be released from these compounds once again through the input of heat.

Moreover, in order to achieve a further reduction of the nitrogen oxide emissions, two-stage SCR catalytic converter systems are known that comprise a first SCR exhaust-gas treatment unit arranged near the engine as well as an SCR catalytic converter that is arranged downstream from it and that is normally located on the undercarriage of the vehicle. In this context, the SCR exhaust-gas treatment unit arranged near the engine can especially be configured as a particulate filter that has an SCR catalytic coating. Consequently, such a catalytically coated particulate filter (also called SDPF) combines the functions of the retention of soot particles as well as of the selective catalytic reduction of nitrogen oxides in the presence of a reductant, especially $NH_3$. Since the SCR exhaust-gas treatment unit or the SDPF is arranged near the engine, this SCR component is quickly heated up to its operating temperature. This permits an early triggering of the reductant metering process and thus an improved $NO_x$ conversion during the entire driving cycle. The downstream SCR catalytic converter serves to further improve the $NO_x$ conversion as well as to prevent the emission of a reductant slip of the SCR unit that is arranged near the engine.

However, the SCR exhaust-gas treatment unit arranged near the engine, especially in the form of an SDPF arranged near the engine, only permits the use of a limited quantity of catalytic SCR coating since otherwise, unacceptable exhaust-gas counter-pressures would arise. Consequently, the $NO_x$ conversion rate of the SCR exhaust-gas treatment unit arranged near the engine is often not sufficient to meet low $NO_x$ emission requirements over the entire operating family of characteristics. For this reason, the downstream SCR catalytic converter continues to be necessary, whereby its volume can be reduced as compared to SCR concepts that use exclusively an undercarriage SCR catalytic converter.

German patent application DE 102 47 989 A1 describes an SCR catalytic converter system that has an oxidation catalyst as well as a downstream SCR catalytic converter. Here, the feed means for feeding the reductant into the exhaust-gas stream is integrated into the oxidation catalyst. This is meant to achieve a good distribution of the reductant as well as to shorten the mixing segment.

German patent application DE 10 2005 055 240 A1 discloses an SCR catalytic converter system with an undercarriage SCR catalytic converter. Upstream from the undercarriage SCR catalytic converter, the exhaust-gas system is divided into a main exhaust-gas system and a secondary exhaust-gas system. A particulate filter is installed in the main exhaust-gas system. Upstream from the particulate filter, there is an oxidation catalyst with an upstream hydrocarbon injection means. The exothermal catalytic oxidation of the fed-in hydrocarbons in the oxidation catalyst produces the necessary temperature for the regeneration of the downstream particulate filter. In the secondary exhaust-gas system, there is likewise an oxidation catalyst as well as a continuously regenerating particle catalyst that has an oxidation-catalytic coating for the particle oxidation. During normal operation, the entire exhaust-gas stream is conveyed through the main exhaust-gas system, where the particles are held back in the particulate filter. During the regeneration operation of the particulate filter, a partial exhaust-gas stream is conveyed through the secondary exhaust-gas system and the other partial stream is conveyed through the particulate filter that is to be regenerated in the main exhaust-gas system. Due to the reduced exhaust-gas mass flow in the main exhaust-gas system, the amount of energy needed to raise the temperature is reduced, as a result of which energy is supposed to be saved and moreover, the SCR catalytic converter is supposed to be less stressed thermally.

SUMMARY THE INVENTION

The invention is based on the objective of putting forward a method for carrying out a reductant metering process of an above-mentioned two-stage SCR catalytic converter system with which an increased $NO_x$ conversion rate is to be achieved, especially over the entire family of characteristics. Moreover, an SCR catalytic converter system configured to carry out the method is to be put forward.

This objective is achieved by a method as well as by an SCR catalytic converter system having the features of the independent claims. Additional advantageous embodiments of the invention are the subject matter of the dependent claims.

The method according to the invention for carrying out a reductant metering process relates to the SCR catalytic converter system that is used in an internal combustion engine and that has a first SCR exhaust-gas treatment unit (especially arranged near the engine) and an SCR catalytic converter located downstream from it as well as a reductant metering device for metering a reductant into the exhaust-gas stream upstream from the first SCR exhaust-gas treatment unit.

According to the invention, the reductant metering process is controlled at least as a function of the temperature of the first SCR exhaust-gas treatment unit and of the downstream SCR catalytic converter, whereby
(I) if the temperature of the first SCR exhaust-gas treatment unit is higher than or equal to a prescribed minimum temperature and if the temperature of the downstream SCR catalytic converter is lower than a prescribed minimum temperature, the reductant metering process takes place in a first mode of operation in such a way that the reductant filling level of the first SCR exhaust-gas treatment unit is lower than its maximum reductant filling level, and
(II) when the temperature of the downstream SCR catalytic converter is higher than or equal to its minimum temperature, the reductant metering process takes place, at least at times, in a second mode of operation in such a way that the reductant filling level of the first SCR exhaust-gas treatment unit is higher than its maximum reductant filling level, so that a reductant breakthrough that is passing the first SCR exhaust-gas treatment unit reaches the downstream SCR catalytic converter.

Here, it is understood that the minimum temperature of the SCR exhaust-gas treatment unit as well as that of the downstream SCR catalytic converter are each selected in such a way as to ensure a certain $NO_x$ conversion capacity, that is to say, so that it corresponds at least to the lower temperature limit of a window of activity in terms of the $NO_x$ conversion. Preferably, the minimum temperature is selected each time so as to correspond to the onset of the catalytic operational readiness of each exhaust-gas treatment component. Advantageously, the so-called light-off temperature can be selected here as well which, by definition, corresponds to the temperature at which 50% of the maximum conversion capacity is present. The light-off temperature is especially dependent on the specific composition of the catalytic coating and it can be different for the first SCR exhaust-gas treatment unit and the downstream SCR catalytic converter.

Therefore, according to the invention, the reductant metering process takes place in at least two modes of operation, whereby either only the first SCR component is charged and loaded with reductant, or else both SCR components are charged and loaded with reductant by means of one single reductant metering device. In the latter case, the loading of the downstream SCR catalytic converter is carried out in that the SCR exhaust-gas treatment unit that is near the engine is overloaded and overflows.

On the one hand, the method according to the invention permits the simultaneous charging of both components with the reductant by means of one single reductant metering device that meters the reductant into the exhaust-gas stream upstream from the first SCR exhaust-gas treatment component. Moreover, the method according to the invention can also be used to control the reductant filling level of both SCR components. Fundamentally, SCR coatings have a certain storage capacity for the reductant, for example, ammonia. Here, it has been found that the $NO_x$ conversion capacity of both SCR components can be increased when a certain quantity of reductant is stored in the appertaining SCR coating. Furthermore, since the reductant metering process is carried out as a function of the temperatures of the two SCR components in the manner according to the invention, it is also ensured that charging a given component with the reductant only takes place when this component has reached its prescribed minimum temperature, which ensures an effective storage and/or catalytic conversion of the reductant. In this manner, undesired reductant emissions are effectively prevented.

In one embodiment of the invention, the SCR catalytic converter system also comprises a particulate filter for removing particulate constituents from the exhaust gas. According to an alternative, especially preferred embodiment of the invention, the first SCR exhaust-gas treatment unit is configured as a particulate filter having a catalytic SCR coating (below also referred to as an SCR particulate filter, SDPF or SPF). This embodiment is advantageous in terms of the required installation space as well as in terms of costs.

According to another preferred embodiment of the invention, the reductant filling level of the first SCR exhaust-gas treatment unit is controlled in the first and second modes of operation on the basis of two different target filling-level characteristic lines, which are temperature dependent. Here, it falls within the scope of the invention that the target filling-level characteristic line used for the second mode of operation is above the corresponding characteristic line of the first mode of operation. In particular, the target filling-level characteristic line for the first SCR exhaust-gas treatment unit in the second mode of operation is above its maximum reductant filling level, at least within a certain temperature range, so that an overflowing of the reductant is systematically forced in this temperature range, that is to say, a reductant breakthrough through the first SCR exhaust-gas treatment unit is forced.

In a preferred embodiment of the invention, in the second mode of operation, that is to say, when both SCR components are ready for operation, the target filling level of the downstream SCR catalytic converter is controlled as a function of the temperature via the reductant filling level of the first SCR exhaust-gas treatment unit. Its $NO_x$ conversion capacity is improved by maintaining a certain target filling level of the SCR catalytic converter.

Preferably, the second mode of operation is ended when the reductant filling level of the downstream SCR catalytic converter reaches or exceeds its temperature-dependent target filling level. In this manner, an overloading of the SCR catalytic converter and thus an undesired reductant breakthrough from said SCR catalytic converter is prevented. Moreover, the second mode of operation is ended when the temperature of the SCR catalytic converter falls below its minimum temperature. This can be the case, for example, in case of a prolonged low-load operation of the internal combustion engine, for example, in city traffic.

It goes without saying that no reductant metering process is carried out when neither of the two SCR components has reached its minimum temperature.

According to a preferred embodiment, after such a forced end of the second mode of operation, the reductant metering process is carried out once again in the first mode of operation, whereby the reductant filling level of the first SCR exhaust-gas treatment unit is lower than its maximum reductant filling level. This prevents a further reductant breakthrough through the SCR exhaust-gas treatment unit that is near the engine. This takes place until the reductant filling level of the SCR catalytic converter reaches or falls below a prescribed temperature-dependent minimum filling level, and when, at the same time, the temperature of the SCR catalytic converter is higher than or equal to its minimum temperature. Consequently, in this manner, the process is switched back and forth between the first and the second modes of operation, depending on the temperature of the SCR catalytic converter as well as on its reductant filling level, and the reductant metering process is controlled as a function of the filling level, making use of the two target filling-level characteristic lines for the first SCR exhaust-gas treatment unit.

Preferably, the reductant filling level of the SCR exhaust-gas treatment unit and/or of the downstream SCR catalytic converter is determined continuously. Here, the determination can be made by means of a balancing procedure as a function of a reductant charge into a given SCR component, as a function of the catalytic reductant consumption, and as a function of the reductant discharge from a given SCR component. In the case of the SCR exhaust-gas treatment unit near the engine, the reductant charge corresponds to the quantity of reductant metered in upstream from this component. The catalytic reductant consumption can be determined on the basis of the $NO_x$ raw emissions of the internal combustion engine, taking into account the conversion capacity of the first SCR exhaust-gas treatment component. The $NO_x$ raw emissions can be modeled as a function of an operating point of the internal combustion engine, or they can be determined by an $NO_x$ sensor arranged upstream from the SCR exhaust-gas treatment unit, or else by means of a combination of modeling and measuring. The reductant discharge from the first SCR exhaust-gas treatment unit can be due, on the one hand, to a reductant desorption, for instance, resulting from a temperature that falls outside of the operating window, as well as due to a reductant breakthrough resulting from an exhausted loading capacity. Consequently, the reductant filling level of the first SCR exhaust-gas treatment unit is determined as a function of the metered-in quantity of reductant, as a function of the $NO_x$ raw emissions of the internal combustion engine, as a function of the reductant desorption and/or as a function of the reductant breakthrough.

In the case of the downstream SCR catalytic converter, its reductant charge is determined by the reductant breakthrough and by the reductant desorption of the first SCR exhaust-gas treatment unit as well as by the catalytic reductant consumption of the SCR catalytic converter. A reductant desorption or a reductant breakthrough from the SCR catalytic converter can be ignored since, for all practical purposes, these do not occur with the inventive control of the reductant metering process. Thus, the reductant filling level of the SCR catalytic converter is preferably determined as a function of the reductant breakthrough and of the reductant desorption of the first SCR exhaust-gas treatment unit and as a function of the catalytic reductant consumption of the SCR catalytic converter.

The metered-in reductant is preferably ammonia $NH_3$ or a precursor compound thereof, whereby here especially urea is a possibility. The urea can be used in the form of solid urea pellets, but preferably in the form of an aqueous urea solution. The metered-in urea reacts via thermolysis and hydrolysis, a process in which it releases $NH_3$. Fundamentally, within the scope of the invention, the reductant, namely, ammonia, can also be kept on hand via $NH_3$ storage materials that reversibly bind or release ammonia as a function of the temperature. Such metal ammine storage complexes were already described above.

The invention also relates to an SCR catalytic converter system comprising a control unit that is configured to carry out the method according to the invention for carrying out the reductant metering process. For this purpose, the control unit especially comprises an appropriate computer-readable program algorithm as well as characteristic lines and/or families of characteristics that are needed in order to carry out the method.

Finally, the invention relates to a vehicle comprising such an SCR catalytic converter system.

BRIEF DESCRIPTION OF THE DRAWINGS

The invention will be explained in greater detail below on the basis of embodiments, making reference to the accompanying drawings. The following is shown.

DETAILED DESCRIPTION OF THE INVENTION

Figure 1:
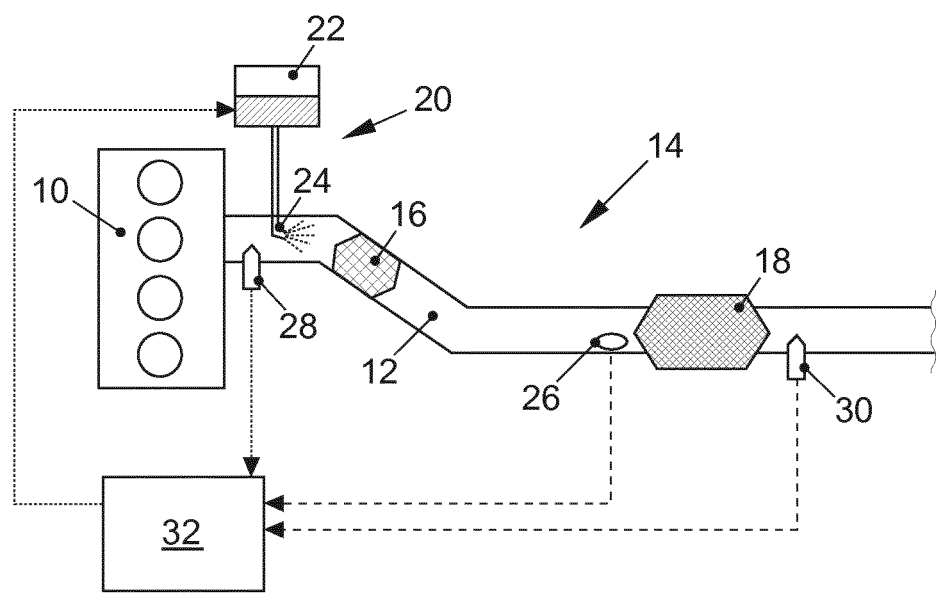
FIG. 1 a schematic view of an exhaust-gas system with an SCR catalytic converter system according to the invention, in an embodiment of the invention.

FIG. 1 shows an internal combustion engine 10 of a vehicle (not shown here). The internal combustion engine 10 is an engine that is always or at least at times operated as a lean burning system, here a (self-igniting) diesel engine. Fundamentally, however, the invention is not limited to diesel engines and can also be used with Otto engines that can be operated as a lean burning system, especially direct-injection Otto engines.

Exhaust gas of the internal combustion engine 10 is conveyed via an exhaust-gas manifold into an exhaust-gas pipe 12, where it undergoes after-treatment by an SCR catalytic converter system that converts nitrogen oxides that are present in the exhaust gas and that is designated in its entirety by the reference numeral 14. Of course, the exhaust-gas system can comprise additional exhaust-gas treatment components that are not shown or mentioned here.

The SCR catalytic converter system 14 has a first SCR exhaust-gas treatment component 16 in a position near the engine, that is to say, a component that has an SCR coating that functions according to the principle of selective catalytic reduction. In the case here, the SCR exhaust-gas treatment component 16 is a diesel particulate filter with a catalytic SCR coating (also called SDPF or SCR particulate filter) that, in addition to its catalytic SCR coating, also fulfills a retention function for particulate exhaust-gas constituents such as soot particles. The structure of diesel particulate filters—also those with catalytic coatings—is generally known and does not call for any further explanation. Here, within the scope of the present invention, the term "near the engine" refers to a distance between the cylinder outlet of the internal combustion engine 10 and the face of the SCR exhaust-gas treatment component 16 amounting to 120 cm at the maximum, especially 100 cm at the maximum, preferably 80 cm at the maximum. In a specific embodiment, the distance is about 75 cm.

The two-stage SCR catalytic converter system 14 also comprises a downstream SCR catalytic converter 18—preferably located on the undercarriage of the vehicle—that likewise has a catalytic SCR coating that can be the same as, or similar to, that of the SCR particulate filter 16. The SCR catalytic converter 18 typically has a larger volume as well as an overall larger quantity of the catalytic SCR coating. Such a catalytic converter system in which the catalytic function is distributed over two exhaust-gas treatment components is also referred to as a two-brick system.

Moreover, the SCR catalytic converter system 14 comprises a reductant metering device 20 for metering in a reductant upstream from the SCR particulate filter 16. In the present example, the reductant is used in the form of an aqueous urea solution (urea-water solution HWL) that is stored in a reductant reservoir 22. From here, it is conveyed via a conveying means (not shown here) such as, for example, a pump, to a nozzle 24 that opens into the exhaust-gas pipe 12 upstream from the SCR particulate filter 16. Due to the high exhaust-gas temperatures at this place, the urea is thermolytically degraded, a process in which it releases the actual reductant, namely, ammonia $NH_3$.

Optionally, treatment means that promote the homogenization and/or the degradation of the urea can also be present between the nozzle 24 and the SCR particulate filter 16. The released ammonia is either stored in the catalytic coatings of the SCR components 14 and/or 16, or else it is directly catalytically converted there with the nitrogen oxides of the exhaust gas of the engine 10, whereby these oxides are then reduced to form nitrogen $N_2$.

The exhaust-gas pipe 12 also contains various sensors. These include, for example, a temperature sensor 26 that measures the exhaust-gas temperature upstream from the SCR catalytic converter 18. Other installation sites for the temperature sensor 26 can also be selected or else several temperature sensors can be located in suitable positions in the exhaust-gas pipe 12. Moreover, installed upstream from the SCR particulate filter 16, there is a first $NO_x$ sensor 28 that detects the $NO_x$ raw emissions of the internal combustion engine 10. As an alternative, the $NO_x$ sensor 28 can be dispensed with and the $NO_x$ raw emissions can be determined as a function of the current engine operating point, especially as a function of the rotational speed and load, by making use of the applicable families of characteristics. Downstream from the SCR catalytic converter 18, there is a second $NO_x$ sensor 30 that serves to monitor the catalytic converter system by means of on-board diagnosis (OBD). Since $NO_x$ sensors also have a cross sensitivity for ammonia, the $NO_x$ sensor 30 is also capable of detecting undesired reductant breakthroughs. Optionally, another $NO_x$ sensor can also be installed between the two SCR components 16, 18.

All of the signals of the sensors are fed to a control unit 32 that further processes these signals and then, as a function of these signals, actuates the reductant metering device 20, especially the appropriate actuators (pumps or valves). For this purpose, the control unit 32 especially has a stored and computer-readable program algorithm as well as requisite characteristic lines and/or families of characteristics. The function fulfilled by the control unit 32 for the inventive control of the reductant metering process will be explained in greater detail below with reference to FIGS. 2 to 4.

Figure 2:
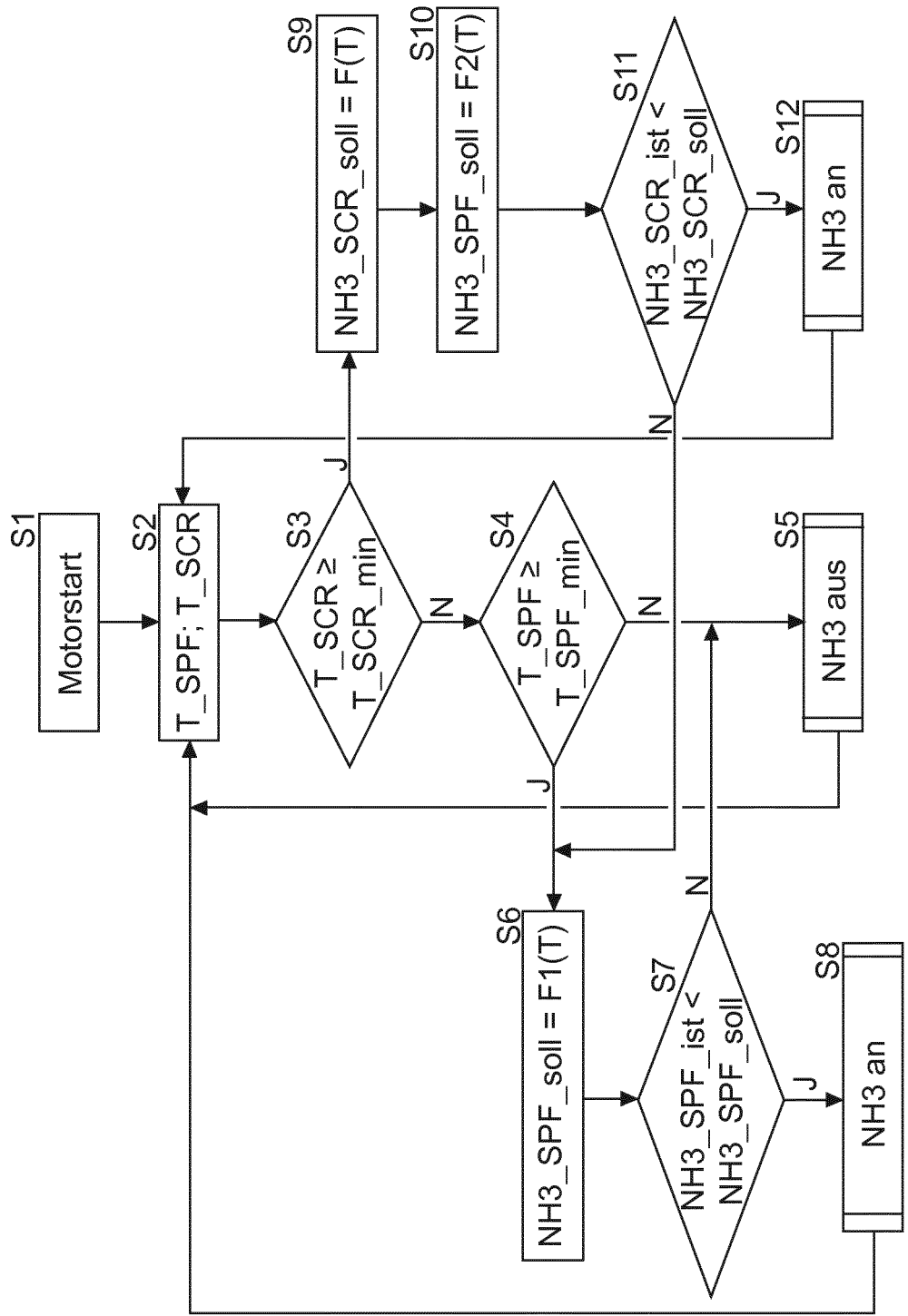
FIG. 2 a flow chart of a method for carrying out a reductant metering process of the SCR catalytic converter system of FIG. 1, in an embodiment of the invention.

FIG. 2 shows a flow chart with a simplified layout of the method according to the invention in a preferred embodiment. The method is initiated after every engine start and repeated in regular cycles.

The method begins in Step S1 with the engine start. After the engine has been started, the process goes to Step S2, in which the temperature of the SCR particulate filter 16 (T_SPF) as well as the temperature of the SCR catalytic converter 118 (T_SCR) are determined. These temperatures can either be completely modeled as a function of the operating point of the internal combustion engine 10 or they can be detected by means of appropriate temperature sensors or else by a combination of both of these modalities. For example, the temperature of the SCR catalytic converter 18 can be determined as a function of the exhaust-gas temperature detected with the temperature sensor 26.

In the subsequent query S3, it is checked whether the temperature of the SCR catalytic converter 18 is higher than or equal to a prescribed minimum temperature T_SCR_min of, for instance, 170° C. [338° F.]. The minimum temperature corresponds at least to a temperature at which the $NO_x$ conversion capacity of the SCR catalytic converter 18 starts, especially its light-off temperature, at which by definition, 50% of the maximum conversion capacity is present. Immediately after the engine start, it can be assumed that the minimum temperature T_SCR_min of the SCR catalytic converter 18 has not yet been reached. In this case, the method goes to query S4, which queries whether the temperature T_SPF of the SCR particulate filter 16 is higher than or equal to a minimum temperature T_SPF_min for the SCR particulate filter 16 of, for instance, 180° C. [356° F.]. This temperature threshold is also set in such a way that a minimum $NO_x$ conversion capacity of the SCR particulate filter 16 is present, for example, the $NO_x$ conversion is just starting or the light-off temperature of the SCR particulate filter 16 has been reached. If the answer to the query in Step S4 is no, that is to say that neither the SCR particulate filter 16 nor the SCR catalytic converter 18 has its respective minimum temperature, then the method goes to Step S5, in which the reductant metering process is deactivated by the metering device 20 or it remains deactivated. The method then goes from Step S5 back to Step S2, in which the temperatures T_SPF and T_SCR are once against determined, so that the queries S3 and S4 are repeated cyclically.

Figure 3:
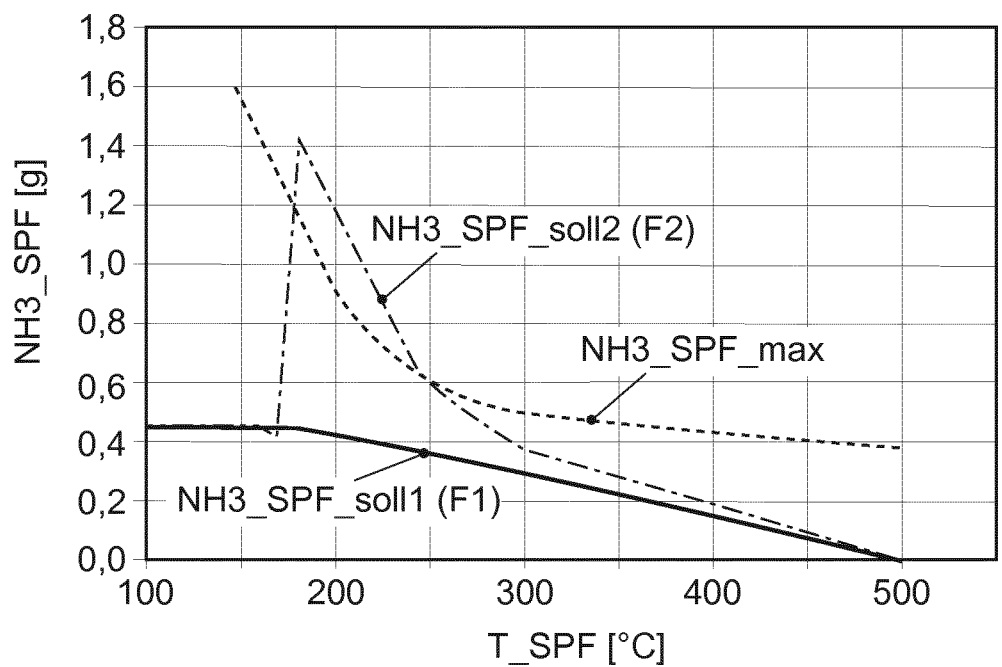
FIG. 3 curves of a first and a second target filling-level characteristic line (F1, F2) for the reductant filling level ($NH_3\_SPF$) of the SCR particulate filter as well as of its maximum reductant filling level ($NH_3\_SPF\_max$) as a function of its mean temperature.

During the engine warm-up phase, the SCR particulate filter 16 is first to reach its prescribed minimum temperature T_SPF_min. At the same time, the undercarriage SCR catalytic converter 18 has normally not yet reached its minimum temperature T_SCR_min. In this case, the answer to the query in Step S4 is yes and the method goes to Step S6, in which, as a function of the temperature T_SPF of the SCR particulate filter 16 determined in Step S1, a target filling level NH$_3$_SPF_target for the SCR particulate filter 16 is prescribed. This is done on the basis of a first target filling-level characteristic line F1, which is shown in FIG. 3. FIG. 3 also shows the maximum reductant filling level NH$_3$_SPF_max of the SCR particulate filter 16. It can be seen that the first target filling-level characteristic line F1 lies below the maximum NH$_3$ filling level over the entire temperature range. In other words, in case the SCR catalytic converter 18 has not yet reached its minimum temperature, but if, at the same time, the SCR particulate filter 16 has already reached its minimum temperature, the reductant metering process takes place in a first mode of operation in such a way that the reductant filling level of the SCR particulate filter 16 is lower than its maximum reductant filling level NH$_3$_SPF_max. Therefore, a reductant breakthrough through the SCR particulate filter 16 is prevented in this first mode of operation.

In the subsequent query in S7, the determined actual filling level NH$_3$_SPF_actual of the SCR particulate filter 16 is compared to the requested target filling level according to the first target filling-level characteristic line F1. For reasons of clarity, FIG. 2 does not show an interim step to this effect, in which the actual filling level of the SCR particulate filter 16 is determined as a function of the metered-in quantity of reductant, as a function of the NO$_x$ raw emission of the internal combustion engine 10 and as a function of a possible reductant desorption and/or of a reductant breakthrough. However, it goes without saying that the current filling level is continuously being determined. If the answer to the query in Step S7 is no, that is to say that the target filling level of the SCR particulate filter 16 has not yet been reached, for example, after an engine start, then the method goes to Step S8, in which the reductant metering process is activated. From Step S8, the method goes back to Step S2 and once again carries out the temperature determination and temperature queries S3 and S4 as well as the filling level query S7. As long as the temperature conditions have not changed significantly and the target filling level NH$_3$_SPF_target has not yet been reached, the reductant metering process continues until the temperature-dependent target filling level threshold for the SCR particulate filter 16 has been reached. In this case, the method goes from the query of S7 to Step S5, in which the reductant metering process is deactivated. If the temperature conditions have not changed, the NH$_3$ metering process remains deactivated until the filling level NH$_3$_SPF_actual has once again fallen below the target filling level NH$_3$_SPF_target. (In fact, here, a minimum filling level threshold is prescribed with a certain margin below the target filling level threshold NH$_3$_SPF_target in order to avoid a constant switching back and forth between the activated and deactivated NH$_3$ metering processes. However, for the sake of clarity, this query is not shown here.)

Figure 4:
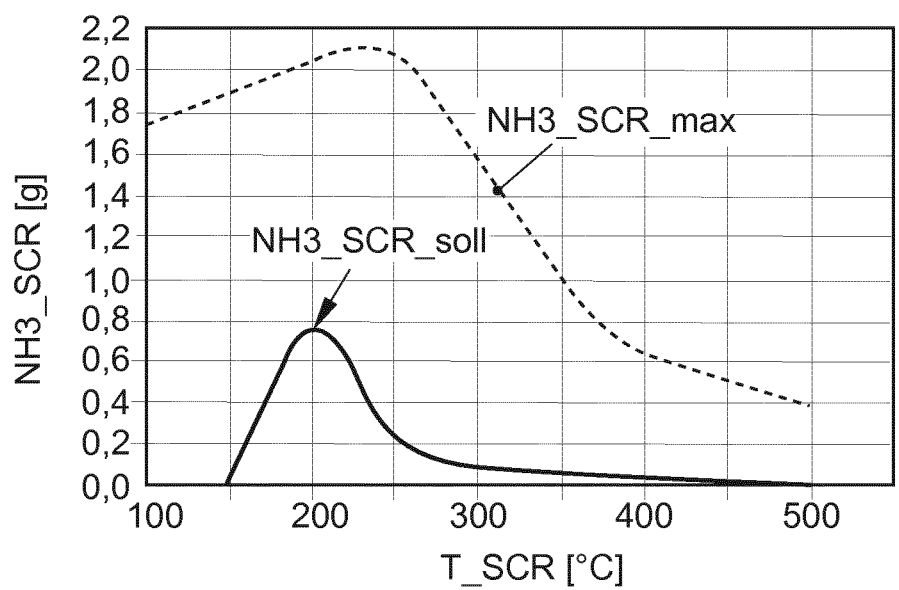
FIG. 4 curves of a target filling-level characteristic line ($NH_3\_SCR\_target$) as well as of the maximum reductant filling level ($NH_3\_SCR\_max$) of the downstream SCR catalytic converter ($NH_3\_SPF$) as a function of its mean temperature.

As soon as the downstream SCR catalytic converter 18 has reached its minimum temperature T_SCR_min, the answer to the query in Step S3 is yes, so that the method then goes to Step S9. In this case, a target filling level NH$_3$_SCR_target is also prescribed for the downstream SCR catalytic converter 18 as a function of its temperature T_SCR. This is determined from an applicable characteristic line NH$_3$_SCR_target (see FIG. 4). FIG. 4 also shows the temperature-dependent maximum target filling level NH$_3$_SCR_max of the SCR catalytic converter 18. It can be seen here that the target filling level NH$_3$_SCR_target is prescribed with a clear safety margin vis-à-vis the maximum filling level NH$_3$_SCR_max.

In order to achieve that the downstream SCR catalytic converter 18 is impinged with the reductant NH$_3$, according to the invention, a reductant breakthrough through the upstream SCR particulate filter 16 is brought about. For this purpose, in the subsequent Step S10, the target filling level NH$_3$_SPF_target of the SCR particulate filter 16 is determined in accordance with a second target filling-level characteristic line F2, which is shown in FIG. 3. It can be seen that the second target filling-level characteristic line lies above its maximum filling level NH$_3$_SPF_max, at least within a certain temperature range of the SCR particulate filter 16. In other words, in this temperature range, the reductant metering process is carried out in such a way that the reductant filling level of the first exhaust-gas treatment unit (SCR particulate filter 16) is higher than its maximum reductant filling level NH$_3$_SPF_max. Consequently, the quantity of reductant that exceeds the maximum filling level overflows the SCR particulate filter 16 and impinges upon the downstream SCR catalytic converter 18 so that the latter is exposed to the reductant NH$_3$.

In the subsequent query S11, the actual reductant filling level NH$_3$_SCR_actual of the SCR catalytic converter 18 is now compared to its target filling level NH$_3$_SCR_target. FIG. 2 does not show the determination of the actual reductant filling level NH$_3$_SCR_actual of the SCR catalytic converter 18, which is carried out continuously as a function of the reductant discharge from the SCR particulate filter 16 and as a function of the reductant consumption of the SCR catalytic converter 18. If the answer to the query in Step S11 is no, as will be the case immediately after the switch-over to the second mode of operation, the method goes to Step S12, in which the reductant metering process is activated.

Starting with Step S12, the method goes to the temperature-determination and temperature-query block of steps S2 to S4. If the temperature conditions have not changed, that is to say, as long as the SCR catalytic converter 18 has its minimum temperature T_SCR_min, the reductant metering process is continued in accordance with the second mode of operation, i.e. with the filling-level characteristic line F2 of the SCR particulate filter 16. This continues until the SCR catalytic converter 18 has reached its target filling level NH$_3$_SCR_target. As soon as this is the case, the answer to the query in Step S11 is no, so that the method goes to Step S6, in which once again the target filling level of the SCR particulate filter 16 NH$_3$_SPF_target is determined in accordance with the first function F1. Since the SCR particulate filter 16 has a reductant charge above the threshold according to the characteristic line F1 in the first cycle after the answer to the query in Step S11 was no, the reductant metering process is then deactivated in Step S5.

Consequently, during the operation of the vehicle, the process is switched back and forth between the first mode of operation, in which the SCR particulate filter 16 is loaded below its maximum filling level in accordance with the characteristic line F1, and the second mode of operation in which the SCR particulate filter 16 is overloaded in accordance with the second filling-level characteristic line F2.

Only when the SCR catalytic converter 18 reaches a lower filling level threshold, which is prescribed with a certain downward margin as compared to the target filling-level characteristic line shown in FIG. 4, is the second mode of operation activated once again.

In the method sequence shown in FIG. 2, the activation of the SCR catalytic converter 18 takes place exclusively as a function of its temperature T_SCR as well as of its reductant filling level NH$_3$_SCR_actual. According to an advantageous embodiment of the invention (not shown here), a minimum $NO_x$ mass flow of the exhaust gas can be required as an additional criterion for the activation of the loading of the downstream SCR catalytic converter 18. In this case, at low $NO_x$ mass flows, only the SCR particulate filter 16 is loaded with reductants, that is to say, it is operated in the filling level mode of operation in accordance with its first characteristic line F1. Only if the $NO_x$ mass flow reaches a threshold that requires the additional conversion capacity of the SCR catalytic converter 18 is it then also loaded with reductant, that is to say, the SCR particulate filter 16 near the engine is overloaded with reductant.

LIST OF REFERENCE NUMERALS 10 internal combustion engine
12 exhaust-gas pipe
14 SCR catalytic converter system
16 SCR exhaust-gas treatment unit/SCR particulate filter
18 SCR catalytic converter
20 reductant metering device
22 reductant reservoir
24 nozzle
26 temperature sensor
28 $NO_x$ sensor
30 $NO_x$ sensor
32 control unit

The invention claimed is:

1. A method for carrying out a reductant metering process of an SCR catalytic converter system of an internal combustion engine,
   wherein the SCR catalytic converter system has a first SCR exhaust-gas treatment unit, an SCR catalytic converter located downstream from the first SCR exhaust-gas treatment unit, and a reductant metering device for metering a reductant into the exhaust-gas stream upstream from the first SCR exhaust-gas treatment unit, whereby the reductant metering process is controlled at least as a function of the temperature of the first SCR exhaust-gas treatment unit and of the downstream SCR catalytic converter, whereby
   if the temperature of the first SCR exhaust-gas treatment unit is higher than or equal to a first prescribed minimum temperature as defined as T_SPF_min and if the temperature of the downstream SCR catalytic converter is lower than a second prescribed minimum temperature as defined as T_SCR_min, the reductant metering process takes place in a first mode of operation in such a way that the reductant filling level of the first SCR exhaust-gas treatment unit is lower than its maximum reductant filling level, and
   if the temperature of the downstream SCR catalytic converter is higher than or equal to T_SCR_min, the reductant metering process takes place in a second mode of operation in such a way that the reductant filling level of the first SCR exhaust-gas treatment unit is higher than its maximum reductant filling level, so that a reductant breakthrough that is passing the first SCR exhaust-gas treatment unit reaches the downstream SCR catalytic converter.

2. The method according to claim 1, wherein either (i) the SCR catalytic converter system also comprises a particulate filter or (ii) the first SCR exhaust-gas treatment unit is configured as a particulate filter having a catalytic SCR coating.

3. The method according to claim 1, wherein the reductant filling level of the first SCR exhaust-gas treatment unit is controlled in the first and second modes of operation on the basis of two different target filling-level characteristic lines, which are temperature dependent.

4. The method according to claim 1 wherein, in the second mode of operation, the target filling level of the downstream SCR catalytic converter is controlled as a function of the temperature via the reductant filling level of the first SCR exhaust-gas treatment unit.

5. The method according to claim 4, wherein the second mode of operation is ended when the reductant filling level of the downstream SCR catalytic converter reaches or exceeds its temperature-dependent target filling level, and/or when the temperature of the downstream SCR catalytic converter falls below T_SCR_min.

6. The method according to claim 5, wherein, after the end of the second mode of operation, the reductant metering process is carried out once again in the first mode of operation in such a way that the reductant filling level of the first SCR exhaust-gas treatment unit is lower than its maximum reductant filling level, until the reductant filling level of the downstream SCR catalytic converter reaches or falls below a prescribed temperature-dependent minimum filling level, and when the temperature of the downstream SCR catalytic converter is higher than or equal to T_SCR_min.

7. The method according to claim 1 wherein the exceeding of a prescribed $NO_x$ mass flow of the exhaust gas is required as an additional criterion for the reductant metering process in accordance with the second mode of operation.

8. The method according to claim 1 wherein the reductant filling level of the first SCR exhaust-gas treatment unit and/or of the downstream SCR catalytic converter is determined as a function of the reductant charge, as a function of the catalytic reductant consumption, and as a function of the reductant discharge.

9. The method according to claim 8, wherein reductant filling level of the first SCR exhaust-gas treatment unit is determined as a function of the metered-in quantity of reductant, as a function of the $NO_x$ raw emissions of the internal combustion engine, as a function of the reductant desorption and/or as a function of the reductant breakthrough through the first SCR exhaust-gas treatment unit.

10. The method according to claim 8, wherein the reductant filling level of the downstream SCR catalytic converter is determined as a function of the reductant breakthrough and as a function of the reductant desorption of the first SCR exhaust-gas treatment unit and as a function of the reductant consumption of the downstream SCR catalytic converter.

11. The method according to claim 1 wherein the reductant is ammonia ($NH_3$) or a precursor compound of ammonia, especially urea, preferably an aqueous urea solution.

12. An SCR catalytic converter system of an internal combustion engine, comprising
   a first SCR exhaust-gas treatment unit arranged near the engine,
   an SCR catalytic converter that is arranged downstream from the first SCR exhaust-gas treatment unit,
   a reductant metering device for metering a reductant into the exhaust-gas stream upstream from the first SCR exhaust-gas treatment unit, and
   a control unit configured to carry out the method for carrying out a reductant metering process according to claim 1.

* * * * *